US012333376B1

(12) United States Patent
Lumsdon et al.

(10) Patent No.: US 12,333,376 B1
(45) Date of Patent: Jun. 17, 2025

(54) TRACKING DEVICE WITH MULTIPLE RADIO FREQUENCY IDENTIFICATION TAGS AND ASSOCIATED METHODS

(71) Applicant: INTERNATIONAL BUSINESS MACHINES CORPORATION, Armonk, NY (US)

(72) Inventors: Martin Lumsdon, Haresfield (GB); Saritha Route, Bangalore (IN); Christoph Raisch, Gerlingen (DE); Mike Ghoraishi, Hisingsbacka (SE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/406,377

(22) Filed: Jan. 8, 2024

(30) Foreign Application Priority Data

Dec. 14, 2023 (GB) ...................................... 2319172

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC ........................ G06K 7/10366; G06K 19/0723
USPC ........................................................ 235/451
See application file for complete search history.

(56) References Cited

U.S. PATENT DOCUMENTS

| 3,752,312 | A  | 8/1973  | Soltanoff |
| 7,151,454 | B2 | 12/2006 | Washington |
| 8,040,242 | B2 | 10/2011 | Carmeli |
| 9,253,876 | B2* | 2/2016 | Elizondo .................. H05K 1/02 |
| 9,398,795 | B2 | 7/2016 | Gupta |
| 9,471,817 | B1* | 10/2016 | Alhazme ............ G06K 19/0716 |
| 9,638,787 | B2 | 5/2017 | Chua |

(Continued)

FOREIGN PATENT DOCUMENTS

| EP | 3509016 A1 | 7/2019 |
| JP | 3817445 B2 | 9/2006 |

(Continued)

OTHER PUBLICATIONS

United Kingdom Patent Office, "Search Report issued," Jun. 16, 2024, 3 Pages, Application No. 2319172.9.

(Continued)

*Primary Examiner* — Michael G Lee
*Assistant Examiner* — David Tardif
(74) *Attorney, Agent, or Firm* — Kristofer Haggerty (57) ABSTRACT

A tracking device is provided including a plurality of radio frequency identification (RFID) tags each having an integrated circuit and a support member having a plurality of detachable portions each detachable portion supporting one of the plurality of RFID tags. Each of the RFID tags has a physical data connector to at least one other of the RFID tags with a physical data connector extending across a boundary of the detachable portion supporting a RFID tag that separates that RFID tag from the other RFID tags with the physical data connector being configured to break when detaching a detachable portion. The physical data connectors provide a data link between the integrated circuits of the plurality of RFID tags so that the integrated circuits have a status activated when one of the physical data connectors is broken.

20 Claims, 6 Drawing Sheets

(56) References Cited

U.S. PATENT DOCUMENTS

| | | | |
|---|---|---|---|
| 10,252,821 B2 | 4/2019 | Dinkelmann | |
| 10,474,943 B2 | 11/2019 | Pascal | |
| 2004/0102979 A1 | 5/2004 | Robertson | |
| 2005/0283272 A1* | 12/2005 | Roberts | G01D 9/007 |
| | | | 700/231 |
| 2008/0177591 A1* | 7/2008 | Mattlin | G06K 17/00 |
| | | | 705/7.29 |
| 2011/0018689 A1 | 1/2011 | McAllister et al. | |
| 2012/0019363 A1* | 1/2012 | Fein | G06K 19/072 |
| | | | 340/10.1 |
| 2013/0057392 A1* | 3/2013 | Bullock | G06K 19/07345 |
| | | | 340/10.5 |
| 2013/0173477 A1 | 7/2013 | Cairns | |
| 2014/0002239 A1 | 1/2014 | Rayner | |
| 2015/0309156 A1 | 10/2015 | Chua | |
| 2018/0032774 A1 | 2/2018 | Kruest | |
| 2019/0080280 A1 | 3/2019 | Tingler | |
| 2019/0156078 A1 | 5/2019 | Hale | |
| 2019/0158289 A1 | 5/2019 | Drouin | |
| 2019/0158470 A1 | 5/2019 | Wright | |
| 2019/0325385 A1 | 10/2019 | Tingler | |
| 2020/0356735 A1* | 11/2020 | Wilkinson | G06K 7/10108 |
| 2021/0027028 A1 | 1/2021 | Corser | |
| 2022/0222504 A1* | 7/2022 | Ambre | G06K 19/07773 |
| 2023/0298048 A1 | 9/2023 | Valentin et al. | |

FOREIGN PATENT DOCUMENTS

| | | |
|---|---|---|
| JP | 2018063723 A | 4/2018 |
| JP | 6420892 B2 | 11/2018 |
| WO | 2013/116414 A1 | 8/2013 |
| WO | 2018/044204 A1 | 3/2018 |

OTHER PUBLICATIONS

NXP Semiconductors, "Electronic Passport(ePP)," Accessed: Dec. 19, 2023, https://www.nxp.com/applications/smart-city/identification/electronic-passportepp: Electronic-Passport, 4 pages.

NXP Semiconductors, "NT3H2111_2211---NTAG I2C plus: NFC Forum T2T with I2C interface, password protection and energy harvesting," Product Data Sheet, Rev. 3.6,—Jul. 21, 2023, https://www.nxp.com/docs/en/data-sheet/NT3H2111_2211.pdf, 84 pages.

ST, "NFC Type 5 / RFID tag IC with up to 2-Kbit EEPROM, product identification and protection," Datasheet, ST25TV02K ST25TV512, DS12074—Rev 12—Dec. 2022, https://www.st.com/resource/en/datasheet/st25tv02k.pdf, 89 pages.

ST, "TN1216 Technical note," ST25 NFC guide, DocID027940 Rev 2, Oct. 2016, https://www.st.com/content/ccc/resource/technical/document/technical_note/f9/a8/5a/0f/61/bf/42/29/DM00190233.pdf/files/DM00190233.pdf/jcr:content/translations/en.DM00190233.pdf, 38 pages.

Thomke, "Mumbai's Models of Service Excellence," Harvard Business Review, Nov. 2012, https://hbr.org/2012/11/mumbais-models-of-service-excellence, 16 pages.

Lumsdon et al., "A Tracking Device With Multiple Radio Frequency Identification Tags and Associated Methods", Application No. 2319172.9, Filed Dec. 14, 2023, 26 Pages (Spec + Drawing).

"NFC Type 5/ RFID tag IC with up to 2-Kbit EEPROM, product identification and protection", ST life.augmented, Dec. 2022, 89 pages.

"TN1216 Technical note, ST25 Nfc guide", ST life.augmented, Oct. 2016, 38 pages.

International Searching Authority, "Notification of Transmittal of the International Search Report and the Written Opinion of the International Searching Authority, or Declaration," Patent Cooperation Treaty, Feb. 27, 2025, 17 pages, International Application No.—PCT/EP2024/084937.

* cited by examiner

TRACKING DEVICE WITH MULTIPLE RADIO FREQUENCY IDENTIFICATION TAGS AND ASSOCIATED METHODS

BACKGROUND

The present invention relates to tracking devices using radio-frequency identification (RFID) tags, and more specifically, to tracking multiple related objects.

Radio-frequency identification uses electromagnetic fields to automatically identify and track tags attached to objects. An RFID tag consists of a tiny radio transponder, a radio receiver and transmitter. When triggered by an electromagnetic interrogation pulse from a nearby RFID reader device, the tag transmits digital data, usually an identifying number, back to the reader. This number can be used to track objects.

Passive tags are powered by energy from the RFID reader's interrogating radio waves. Active tags are powered by a battery and thus can be read at a greater range from the RFID reader, up to hundreds of meters.

Multiple objects may be related and tracking of their different locations would be beneficial. Related objects may need to take differing routes on a journey to a destination. Tracking of such objects is conventionally carried out using a look up in a central database of individual RFID tag identifying numbers and relating them through information in the database.

SUMMARY

According to an aspect of the present invention there is provided a tracking device comprising: a plurality of radio frequency identification (RFID) tags each having an integrated circuit; a support member having a plurality of detachable portions each detachable portion supporting one of the plurality of RFID tags; wherein each of the RFID tags has a physical data connector to at least one other of the RFID tags with a physical data connector extending across a boundary of the detachable portion supporting a RFID tag that separates that RFID tag from the other RFID tags with the physical data connector being configured to break when detaching a detachable portion; and wherein the physical data connectors provide a data link between the integrated circuits of the plurality of RFID tags so that the integrated circuits have a status activated when one of the physical data connectors is broken.

This has the advantage of a group of linked RFID tags being provided with a detached RFID tag being automatically known to have been detached with a status received at the other RFID tags.

The physical data connector may be configured to activate a status to the at least one other of the RFID tags of the device upon breaking including a unique code of the RFID tag on the detached portion.

Each RFID tag may include an integrated circuit programmed to store a shared secret of the plurality of RFID tags. The shared secret may be exchanged between RFID tags through the physical data connectors.

The shared secret has the advantage of preventing unauthorized reading of the RFID tags and ensures that the linked RFID tags are mutually recognized. The shared secret is exchanged through the physical data connectors to prevent re-programming after the connector has been broken.

The separated RFID tags have synchronized programming that ensures that when they are read, they can be related via their readers without a central database.

According to another aspect of the present invention there is provided a method for tracking a product, said method comprising: providing a tracking device having a support member supporting a plurality of radio frequency identification (RFID) tags and having a plurality of detachable portions each detachable portion supporting one of the plurality of RFID tags and the plurality of RFID tags being linked together by physical data connectors that extend across boundaries of the detachable portions; activating a status on the programmable link responsive to breaking a physical data connector when detaching a detachable portion supporting a first RFID tag, the status being received by one or more of the other RFID tags.

According to a further aspect of the present invention there is provided a method for providing a tracking device, said method comprising: providing a tracking device having a support member supporting a plurality of radio frequency identification (RFID) tags and having a plurality of detachable portions each detachable portion supporting one of the plurality of RFID tags and the plurality of RFID tags being linked together by physical data connectors that extend across boundaries of the detachable portions; and applying programming to the plurality of RFID tags to correlate the information stored on the RFID tags.

The computer readable storage medium may be a non-transitory computer readable storage medium and the computer readable program code may be executable by a processing circuit.

BRIEF DESCRIPTION OF THE DRAWINGS

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a tracking device including a plurality of radio frequency identification (RFID) tags are described as well as associated methods of manufacture and use of the tracking device.

A tracking device is provided initially as a single device having a plurality of radio frequency identification (RFID) tags. The tracking device includes support member having a plurality of detachable portions each detachable portion supporting one of the plurality of RFID tags. The RFID tags may be passive or active RFID tags.

Each of the RFID tags has a physical data connector to at least one other of the RFID tags with the physical data connector extending across a boundary of the detachable portion supporting the RFID tag that separates the RFID tag from the other RFID tags.

The plurality of RFID tags are each initially programmed to be related to each other by having synchronized programming. This may be used as a tracking process with an updatable status of each of the plurality of RFID tags. The plurality of RFID tags each store a shared secret to control access to the information and status of the RFID tags.

When being used, the tracking device is broken at one or more boundary into two or more detached portions. A smallest detached portion may have a single RFID tag supported on it. The physical data connector is configured to break when detaching a detachable portion to separate the RFID tag of that portion from the rest of the RFID tags. The physical data connector provides a data link between the plurality of RFID tags that is configured to have a status activated when the physical data connector is broken.

In this way, in use the detached portion with the single RFID tag can be attached to an object whilst the remainder of the tracking device (with one or more RFID tags) may be attached to another object or kept at a location. More than one detached portion each with an RFID device may be separated from the single tracking device. The separated RFID tags have synchronized programming that ensures that when they are read they can be related via their readers without a central database. The stored shared secret ensures that access to the information and status of the RFID tags is limited to the related RFID tags.

Figure 1A:
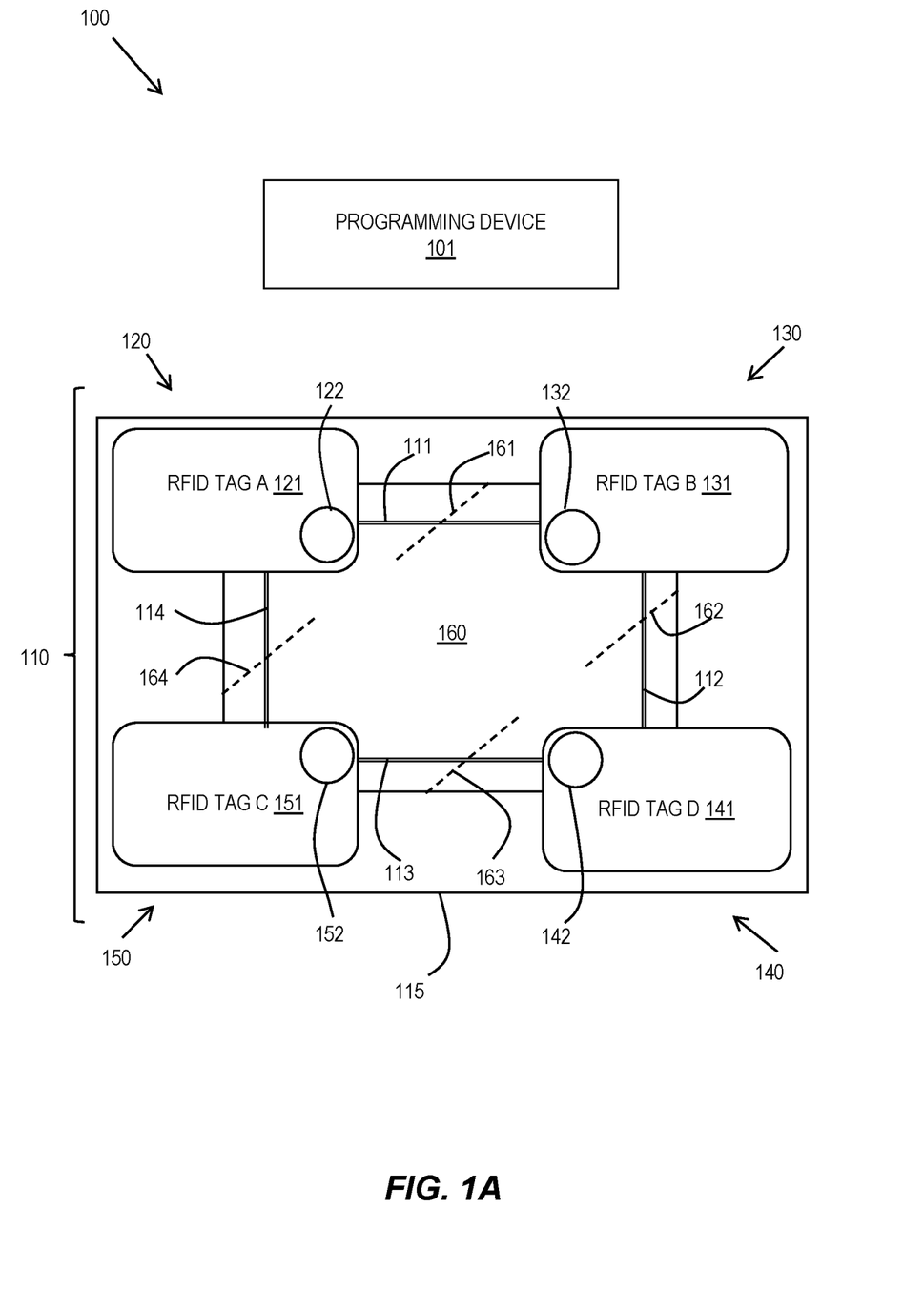
FIGS. 1A and 1B are schematic diagrams of a tracking device in accordance with embodiments of the present invention.

Referring to FIG. 1A, a schematic diagram 100 shows an example embodiment of a tracking device 110 and a programming device 101.

The tracking device 110 has a plurality of RFID tags 121, 131, 141, 151 provided on a support member 160. The support member 160 has a plurality of detachable portions 120-140 with each detachable portion supporting one of the plurality of RFID tag 121, 131, 141, 151.

Each of the RFID tags 121, 131, 141, 151 includes a substrate supporting an integrated circuit 122, 132, 142, 152 in the form of a micro-chip which stores and processes information and modulates and demodulates radio-frequency (RF) signals, and an antenna for receiving and transmitting the signal. The RFID tags include programmable logic for processing information data and non-volatile memory for storing information. The RFID tags are read/write, where object-specific data is written into the tag by a programming device 101. When read, an RFID tag receives a message and then responds with its identification and other information.

Each of the RFID tags 121, 131, 141, 151 has a physical data connector 111-114 to at least one other of the RFID tags 121, 131, 141, 151 with the physical data connector 111-114 extending across a boundary 161-164 of the detachable portions supporting the RFID tags 121, 131, 141, 151. The physical data connectors 161-164 are configured to break when detaching the detachable portions 120, 130, 140, 150.

The physical data connectors 111-114 provides a data link between the integrated circuits (ICs) 122, 132, 142, 152 of the RFID tags 121, 131, 141, 151 so that the ICs 122, 132, 142, 152 have a status activated when a physical data connector 111-114 is broken.

The example embodiment of FIG. 1 shows a tracking device 110 with four RFID tags 121, 131, 141, 151 disposed on corners of a rectangular support member 160 and with physical data connectors 111-114 provided between the RFID tags 121, 131, 141, 151 along the edges of the support member 160. Perforation boundaries 161-164 are provided in the support member 160 defining at least parts of the boundaries of the detachable portions 120, 130, 140, 150.

The 1:1 and 1:M linkage of the RFID tags may be extended from two interlinked RFID tags to a ring of n RFID tags.

In a simplest embodiment, the tracking device may have two RFID tags provided on a supporting member that can be divided into two detachable portions each supporting one RFID tag. In such an embodiment, a single physical data connector may be provided between the two RFID tags and crossing a boundary of the two detachable portions.

In another embodiment, there may be more than four RFID tags provided in a ring arrangement, with physical data connectors provided around the ring connecting adjacent RFID tags.

In a further embodiment, there may be three or more RFID tags provided in a star arrangement with a central RFID tag and with the outer RFID tags each having a physical data connector to the central RFID tag and with the outer RFID tags being detachable from each other and from the central RFID tag.

The support member 160 may be formed of two sealed planar layers encapsulating the RFID tags 121, 131, 141, 151. The RFID tags 121, 131, 141, 151 and physical data connectors 111-114 may be sandwiched between thin layers of conductive sheets that form the support member 160 to provide an electromagnetic shield 115 against tampering or extracting whilst programming.

The physical data connectors 111-114 between the RFID tag ICs 122, 132, 142, 152 may each be a thin wire and may be an additional RFID antenna jointly used by multiple ICs. The antenna functionality gets destroyed by separating the RFID tags 121, 131, 141, 151. In one embodiment, the additional RFID antenna may be used to initiate personalization by using a different frequency range than disconnected access. Electromagnetic antennas are tuned through physical characteristics to operate on certain frequencies; therefore, when changing the physical characteristics when cutting the connector, the resonant frequency of the antenna changes and so it is not capable of communicating any more on that frequency.

The ICs 122, 132, 142, 152 of the multiple RFID tags 121, 131, 141, 151 are electrically connected to each other while being programmed to be personalized as a linked group of RFID tags 121, 131, 141, 151. While being powered through an external RFID field provided by the programming device 101, the ICs 122, 132, 142, 152 exchange information through the electrical connection.

Each RFID tag 121, 131, 141, 151 includes a unique code of that RFID tag. The physical data connector is configured to activate a status to the at least one other of the RFID tags of the device upon breaking including the unique code of the RFID tag on the detached portion.

Each RFID tag 121, 131, 141, 151 includes an IC 122, 132, 142, 152 programmed to store a shared secret of the plurality of RFID tags. The shared secret uses public and private keys to control access to the information on the RFID tags. The exchange information during programming includes generating the shared, private secret to prevent reading the information from the RFID tags without authorization from another tag. The shared secret may include the use of public and private keys to ensure that only authorized parties can access information during the relevant points in the tracking process. There may be a primary RFID tag 121 with the other RFID tags 131, 141, 151 being secondary tags such wherein the public key part may be deployed on the secondary tags and the private key will remain on the primary RFID tag. Alternatively, each RFID tag 121, 131, 141, 151 may operate as either a primary or secondary and may have multiple shared public keys.

Each RFID tag 121, 131, 141, 151 includes an IC 122, 132, 142, having synchronized programming of a tracking process for an updatable status of the plurality of RFID tags. When the RFID tags are broken apart the process activates a change in the status of the RFID tags and this then can be used to activate the tracking process. The tracking process includes the RFID tags becoming activated and readable when they are detached. The detached portions are readable by RFID readers and the information in the RFID tags enables the portions to be identified as having been initially linked enabling a 1:1 or 1:many tracking.

After the programming has completed, the RFID tags 121, 131, 141, 151 are disconnected and separated from each other and can be moved to different physical locations. When a physical data connector 111-114 is cut between the RFID tags, a signal of the break is stored in a signal store of the ICs of the RFID tags. The RFID tags may be matched by the same stored signal.

The information held on the tags will enable the RFID tags to be reconciled so all tags will know they are part of a linked group (for example, part of a consignment or package) and that there are a given number of tags in total all linked. When the RFID tags 121, 131, 141, 151 are read they may show the RFID tag number as 1 of 6 or 2 of 6 so there is a correlation between the RFID tags 121, 131, 141, 151 as well as a description.

The disconnection of one or more RFID tags may happen while the RFID tags are still being powered by the programming device 101. The RFID tags may detect through current sensing the disconnect and may change a persistent internal state from connected to disconnected. This may act like burning an eFuse or changing an erasable programmable read-only memory (EPROM) cell. An eFuse allows circuits on the ICs 122, 132, 142, 152 to change after manufacture when the connector is cut. This change is used to indicate the disconnection of the RFID tag. An on-chip EPROM may be used to store an indicator of the disconnection of the RFID tag.

Figure 1B:
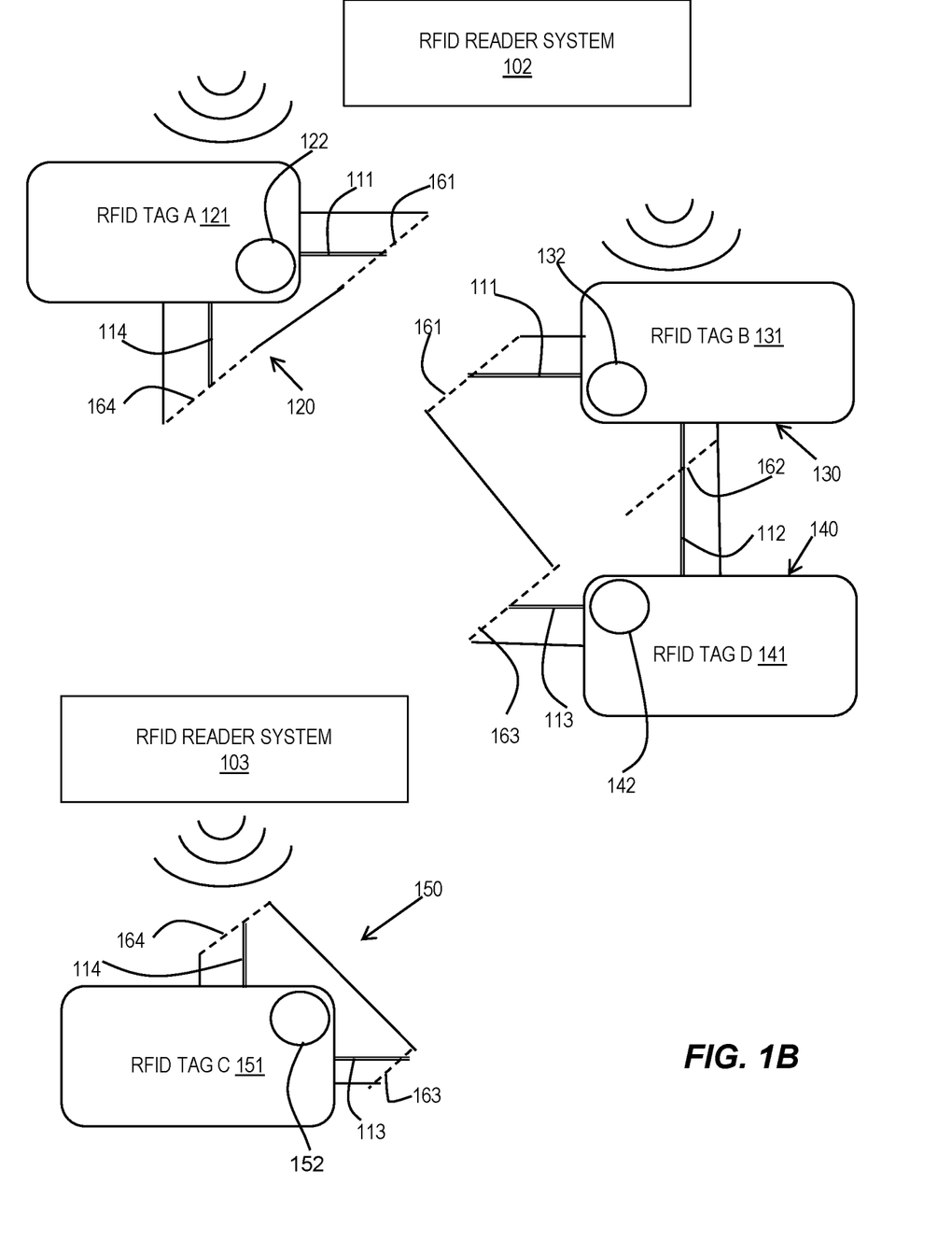

Referring to FIG. 1B, the tracking device 110 is shown broken into different tracking portions. A first tracking portion 120 has RFID tag A 121 and is formed by breaking the portion off through the perforation boundaries 161 and 164 thereby breaking the physical data connectors 111 and 114. A second tracking portion is a combined portion 130 and 140 having RFID tags B 131 and C 141 and is formed by breaking the portion off through the perforation boundaries 161 and 163 thereby breaking the physical data connectors 111 and 113. A third tracking portion 150 has RFID tag C 151 and is formed by breaking the portion off through the perforation boundaries 164 and 163 thereby breaking the physical data connectors 114 and 113.

When the portions are broken off and the physical data connectors cut, signals of the breaks are stored in the signal stores of the ICs of the RFID tags. These signals may indicate, signals between A and B+C, signals between A and D, signals between D and B+C.

Later, the RFID tags can be compared through reading their content using RFID reader systems 102, 103 using challenge-response algorithms or asymmetric-key algorithms, which prove the tags have been connected at programming time.

The RFID tags may use challenge response or asymmetric key algorithms while communicating through the same RFID reader system 102 between each other to confirm via the RFID reader 102 that they actually have been programmed together.

A remote proof of ownership may be provided by two communicating RFID reader systems 102, 103 communicating over distance. A first RFID reader system 102 can read RFID tag A 121 and a second RFID reader system 103 can reads data on RFID tag C 151 and then they can validate the shared secret based on a match protocol that can be built.

Public-key cryptography, or asymmetric cryptography, is the field of cryptographic systems that use pairs of related keys. Each key pair consists of a public key and a corresponding private key. Key pairs are generated with cryptographic algorithms based on mathematical problems termed one-way functions. Security of public-key cryptography depends on keeping the private key secret; the public key can be openly distributed without compromising security.

A public key encryption system is for encrypting communication to provide confidentiality where a message that a sender encrypts using the recipient's public key can be decrypted only by the recipient's paired private key. Another application in public key cryptography is the digital signature. Digital signature schemes can be used for sender authentication.

In this context, the RFID tags have the public keys of the other RFID tags that were initially all programmed together. When an RFID tag is read, the public key is needed for the corresponding private key of the RFID tag. The public key is obtained by reading one of the other RFID tags to obtain the public keys of the initially linked RFID tags. Using this shared secret during the reading of the RFID tags ensures that the RFID tags were the tags that were initially linked together. There may be a primary RFID tag and secondary RFID tags wherein the public key part will be deployed on the secondary tags and the private key will remain on the primary RFID tag. Alternatively, each tag may operate as either a primary or secondary and may have multiple shared public keys.

Encryption may be used for altering data so that it cannot be read by those for whom it is not intended. In RFID systems encryption is used to protect stored information or to prevent the interception of communications between RFID tag and reader.

RFID systems can be classified by the type of tag and reader. There are three types and any of this may be used for the RFID tags described herein.

A Passive Reader Active Tag (PRAT) system has a passive reader which only receives radio signals from active tags (battery operated, transmit only). The reception range of a PRAT system reader can be adjusted from 1-2,000 feet (0-600 m), allowing flexibility in applications such as asset protection and supervision.

An Active Reader Passive Tag (ARPT) system has an active reader, which transmits interrogator signals and also receives authentication replies from passive tags.

An Active Reader Active Tag (ARAT) system uses active tags activated with an interrogator signal from the active reader. A variation of this system could also use a Battery-Assisted Passive (BAP) tag which acts like a passive tag but has a small battery to power the tag's return reporting signal.

Fixed readers are set up to create a specific interrogation zone which can be tightly controlled. This allows a highly defined reading area for when tags go in and out of the interrogation zone. Mobile readers may be handheld or mounted on carts or vehicles.

Figure 2:
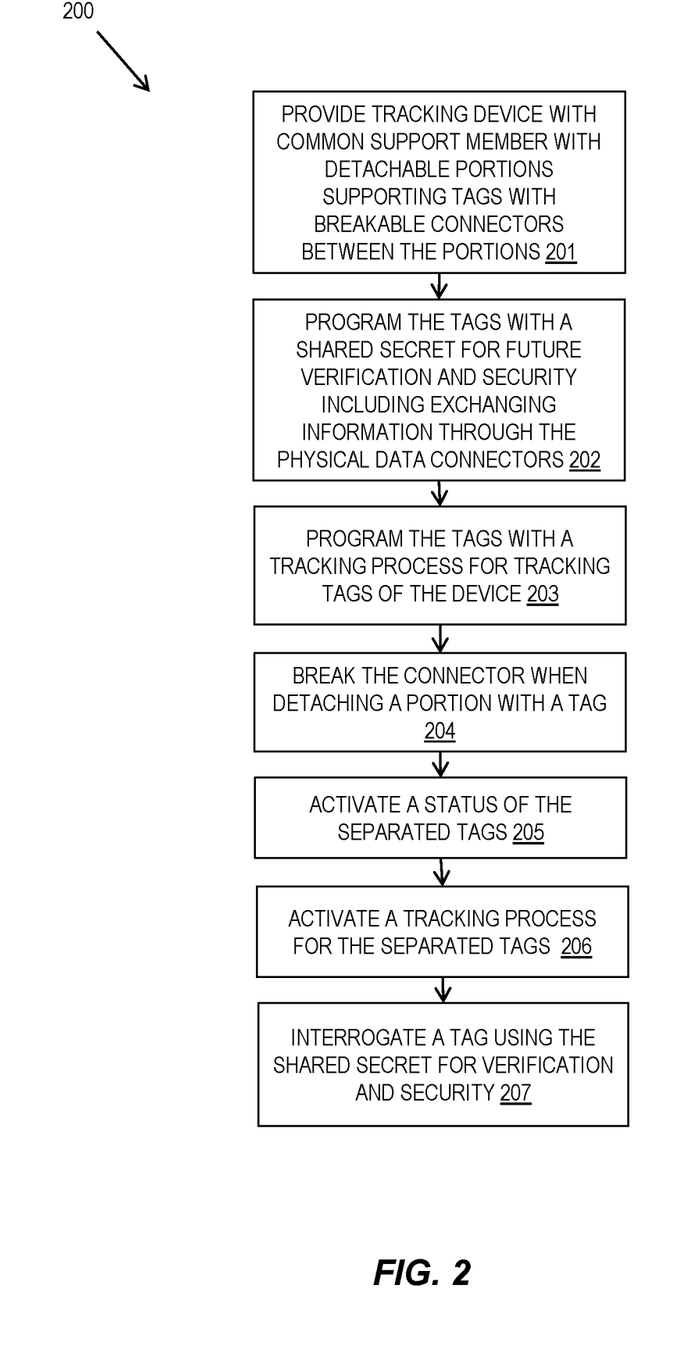
FIG. 2 is a flow diagram of an example embodiment of an aspect of a method in accordance with embodiments of the present invention.

Referring to FIG. 2, a flow diagram 200 shows and example embodiment of a method of providing and using a tracking device 110.

The method may provide 201 a tracking device having a support member supporting a plurality of RFID tags and having a plurality of detachable portions each detachable portion supporting one of the plurality of RFID tags and the plurality of RFID tags being linked together by physical data connectors that extend across boundaries of the detachable portions.

The method may program 202 the RFID tags with a stored shared secret for future verification and security including exchanging information through the physical data connectors. The shared secret may use public and private keys to control access to the information on the RFID tags.

The method may also program 203 the RFID tags with a tracking process for receiving status updates from the other RFID tags that were originally linked.

The method may include breaking 204 at least one of the physical data connectors to detach at least one portion of the tracking device.

The method may activate 205 a status on the programmable link responsive to breaking one of the physical data connectors when detaching a detachable portion supporting an RFID tag, the status being received by one or more of the other RFID tags. The method may activate 206 a tracking process for the separated RFID tags.

The method may interrogate 207 an RFID tag on a detached portion to read a status update and relate the status to other RFID tags that were originally linked. The interrogation 207 may use the shared secret for verification and security when reading an RFID tag such that a tag may only be read when in proximity to a linked RFID tag with a common RFID tag reader or via a communication device between linked RFID tags.

Figure 3A:
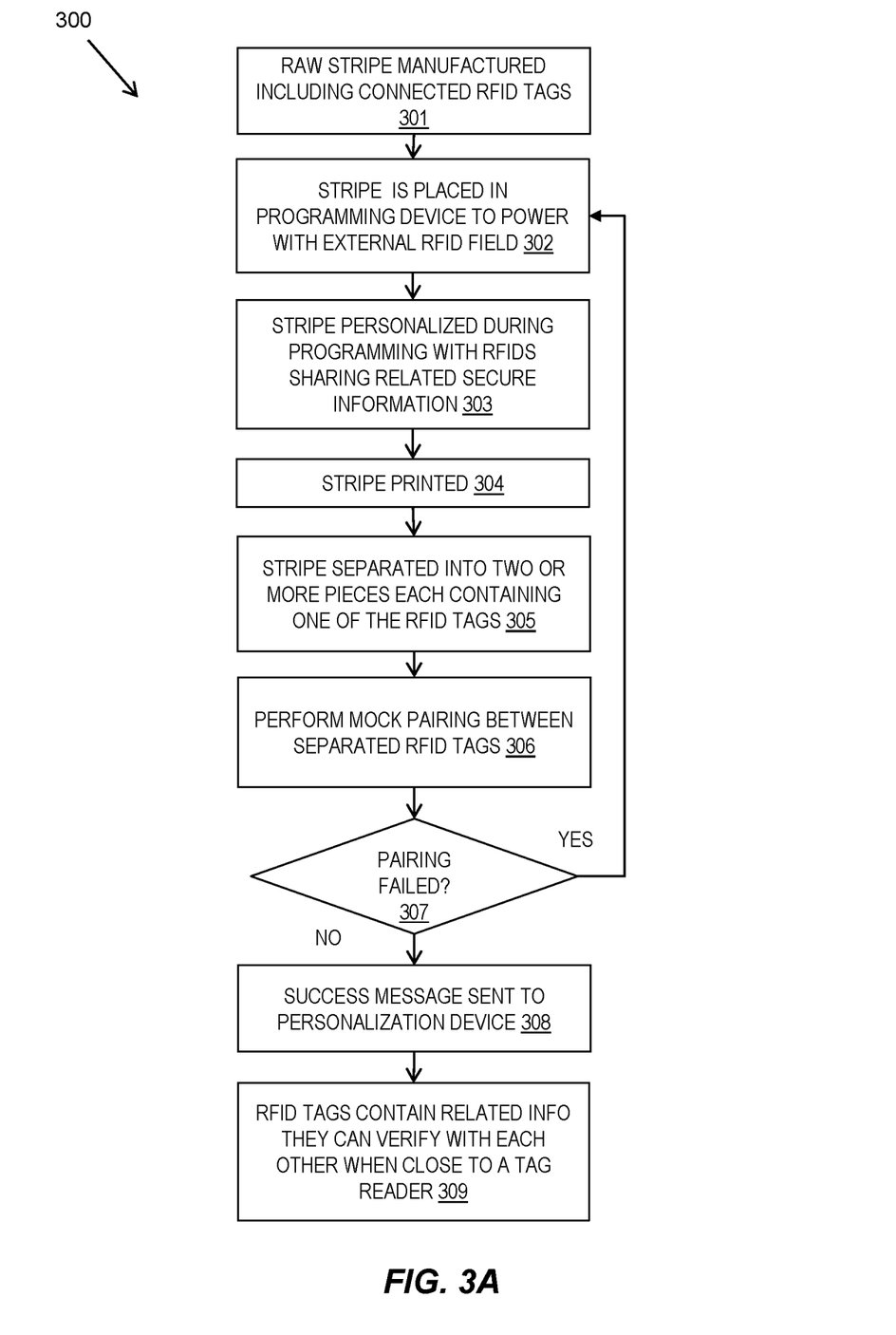
FIGS. 3A, 3B and 3C are flow diagrams of an example embodiment of another aspect of a method in accordance with embodiments of the present invention.
Figure 3B:
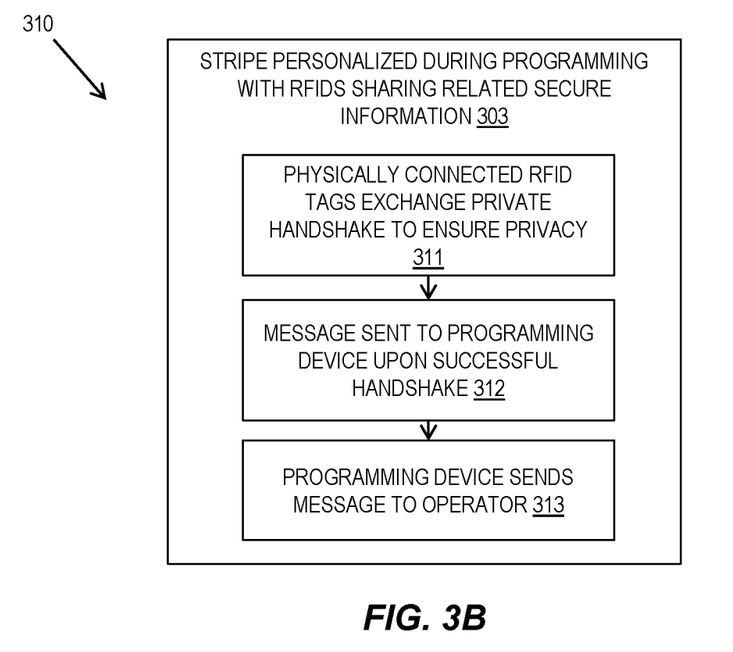
Figure 3C:
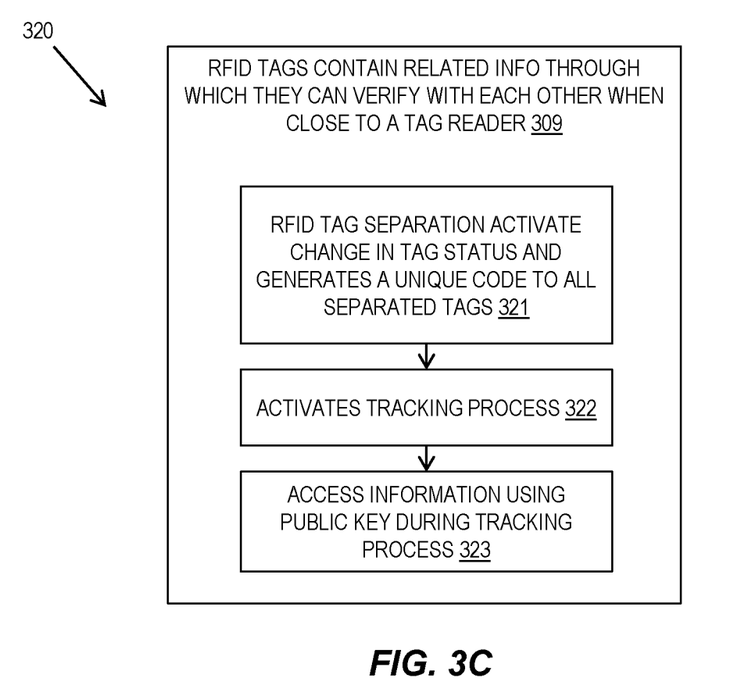

Referring to FIGS. 3A, 3B and 3C, flow diagrams 200, 210, 220 show an example embodiment of a production process for a tracking device 110 and a tracking process.

A tracking device in the form of a raw stripe is manufactured 301 with connected RFID tags and is placed 302 in a programming device to power with an external RFID field. The stripe is personalized 303 during programming with the RFIDs sharing related secure information. The RFIDs may exchange private data/keys through the physical connections between them.

Referring to FIG. 3B, the flow diagram 310 shows further details of the personalization 303 of the RFID tags. The physically connected RFID tags exchange 311 private handshakes through which they ensure the privacy, uniqueness, and correlation of the information stored on them without sharing this information outside the private connection. A message is sent 312 to the programming device upon successful handshake. The programming device sends 313 a message to the operator confirming completion of the personalization.

Returning to the flow diagram 300 of FIG. 3A, the stripe is printed 304 and separated 305 into two or more pieces each containing at least one RFID tag.

The RFID tags may perform 306 a mock pairing. It is determined if the pairing has failed 307 and, if so, the method loops to re-program the stripe. If the pairing is successful, a confirmation success message is sent 308 to the personalization device.

The RFID tags then contain related information through which they can verify 309 their relationship when close to a RFID tag reader.

Referring to FIG. 3C, the flow diagram 320 shows further details of the verification 309 of the RFID tags. The RFID tag separation activates 321 a change in the tag status and generates a unique code to all separated tags of the stripe. The method activates 322 a tracking process. The method may access 323 information using a public key during the tracking process. Encryption is used in the linked RFID tags to alter data so that it cannot be read by those for whom it is not intended. In RFID systems encryption is used to protect stored information or to prevent the interception of communications between RFID tag and reader.

There are many and varied possible used cases of the described tracking device and a few are described as examples.

The tracking device may be used in scenarios where ownership needs to be proved, where goods/services are returned, or when goods/services are returned to a specific location/person/system.

The tracking device may be used for baggage check-in and claims in airports and in other forms of travel, where the passenger and luggage are identified as belonging together (i.e. at check-in) and then follow separate paths and then are reunited at termination of the journey (i.e., baggage claims). If two tags are brought together again (for example, luggage and its owner), the owner's tag is read by a reader that extracts a public key of the luggage tag. The luggage tag is read by the reader using the public key from the owner's tag to make sure that the tags are related. In a remote scenario, the same happens but the public key must be sent remotely to the second reader.

The tracking device may be used for valet parking or car service. Tags may be printed at time of handing over to parking attendant and the tags are separated-one with the car key and the other with the owner, and then are re-joined at collection.

The tracking device may be used for a security lock on dangerous items. The law may mandate that a key cannot be stored along with the dangerous item. Additional security can be built in with a third validation tag being printed as well.

The tracking device may be used in other situations where a shared secret is created in a protected environment or/and where a joint provenance is applicable.

The tracking device may be used with bank lockers with three-way security with a third party involved.

The tracking device may be used for high-security access areas as an addition to access biometrics etc. as a limited time duration pass that cannot be hacked and with biometrics, it also cannot easily be stolen.

The tracking device may be used making high end spares theft proof. Similarly, parts that work together as a unit cannot be separated and resold.

Entities are identified as having been cojoined at inception and when the tags are reattached or reunited, thus proving their cojoined provenance and joint identity. The method may generate shared secrets between multiple tags with the shared data being stored in a low cost protected environment.

In the described system, the RFID tags are connected directly to eliminate any external system that can observe data that is shared between the RFID tags. No central database is required and data is stored locally in the tags thereby removing any dependence on any external data management system. This increases the cost and difficulty of an attack on the stored data.

In the described system, the RFID tags share a common set of information that joins/pairs the tags logically from the time of creation.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 4:
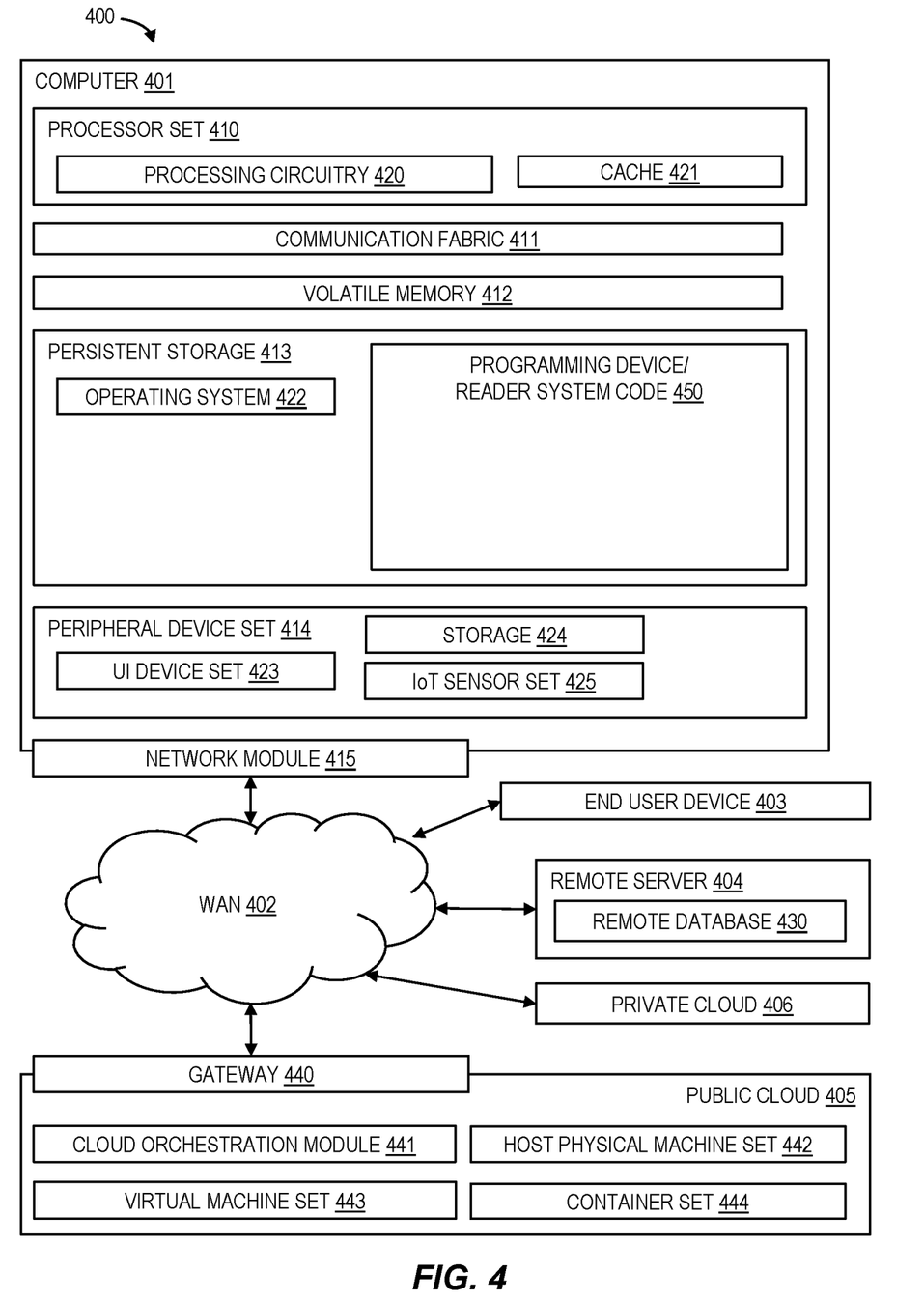
FIG. 4 is a block diagram of an example embodiment of a computing environment for the execution of at least some of the computer code involved in performing the present invention.

Referring to FIG. 4, computing environment 400 contains an example of an environment for the execution of at least some of the computer code involved in performing the inventive methods, such as a programming device or reader system code 450. In addition to block 450, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 450, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 450 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 450 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments.

Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A tracking device comprising:
a plurality of radio frequency identification (RFID) tags each having an integrated circuit;
a support member having a plurality of detachable portions with each detachable portion supporting one of the plurality of RFID tags;
wherein the plurality of RFID tags are connected by a plurality of physical data connectors, and wherein detaching the detachable portion supporting one of the plurality of RFID tags breaks a physical data connector of the plurality of physical data connectors connecting the one of the plurality of RFID tags to the plurality of RFID tags; and
wherein the plurality of physical data connectors provide a data link between the integrated circuits of the plurality of RFID tags so that the integrated circuits have a status activated when one of the plurality of physical data connectors is broken, wherein the status further indicates an object number of the detached one of the plurality of RFID tags out of the total number of the plurality of RFID tags required to access information controlled by the plurality of RFID tags.

2. The tracking device of claim 1, wherein the physical data connector is configured to activate the status to the plurality of RFID tags of the detaching of the one of the plurality of RFID tags upon breaking, the status further including a unique code of the one of the plurality of RFID tags.

3. The tracking device of claim 2, wherein the physical data connector is configured to activate the status by changing a persistent internal state of the integrated circuit on the plurality of RFID tags.

4. The tracking device of claim 1, wherein each of the plurality of RFID tags include an integrated circuit programmed to store a shared secret of the plurality of RFID tags.

5. The tracking device of claim 4, wherein the shared secret is exchanged between the plurality of RFID tags through the plurality of physical data connectors.

6. The tracking device of claim 4, wherein the shared secret uses public and private keys to control access to the information on the plurality of RFID tags.

7. The tracking device of claim 6, wherein a first of the plurality of RFID tags is a primary RFID tag and a remainder of the plurality of RFID tags are secondary RFID tags, wherein a public key part is deployed on the secondary RFID tags and a private key part remains on the primary RFID tag.

8. The tracking device of claim 1, wherein the plurality of physical data connectors are an additional RFID antenna jointly used by multiple RFID tags of the plurality of RFID tags to initiate personalization by using a different frequency range than disconnected access.

9. The tracking device of claim 1, wherein the support member is formed of two sealed planar layers encapsulating the plurality of RFID tags.

10. The tracking device of claim 1, wherein boundaries of the detachable portions are perforated boundaries for detaching the detachable portions.

11. A method for tracking a product, said method comprising:
providing a tracking device having a support member supporting a plurality of radio frequency identification (RFID) tags and having a plurality of detachable portions with each detachable portion supporting one of the plurality of RFID tags and the plurality of RFID tags being linked together by physical data connectors that extend across boundaries of the detachable portions; and
activating a status on the programmable link responsive to breaking a physical data connector when detaching a detachable portion supporting a first RFID tag, the status being received by one or more of the other RFID tags and indicative of an object number of the first RFID tag out of the total number of the plurality of RFID tags required to access information controlled by the plurality of RFID tags.

12. The method of claim 11, wherein activating the status includes providing a unique code of the first RFID tag on breaking the physical data connector.

13. The method of claim 11, including interrogating an RFID tag on a detached portion to read a status update and relate the status to other RFID tags that were originally linked.

14. The method of claim 11, including interrogating an RFID tag on a detached portion using a shared secret to access status information.

15. The method of claim 14, including remotely interrogating two RFID tags to validate the shared secret based on a match protocol between two remote RFID readers.

16. The method of claim 14, including locally interrogating two RFID tags to validate the shared secret based on a match protocol through a shared RFID reader.

17. The method of claim 11, including detaching an RFID tag while being powered by an external radio frequency field and the other RFID tags detecting the disconnect and changing a persistent internal state from connected to disconnected.

18. A method for providing a tracking device, said method comprising:
   providing a tracking device having a support member supporting a plurality of radio frequency identification (RFID) tags and having a plurality of detachable portions each detachable portion supporting one of the plurality of RFID tags and the plurality of RFID tags being linked together by physical data connectors that extend across boundaries of the detachable portions; and
   applying programming to the plurality of RFID tags to correlate the information stored on the RFID tags, wherein breaking of the physical data connectors activate a status indicative of an object number of a detached RFID tag of the plurality of RFID tags out of the total number of the plurality of RFID tags required to access the information controlled by the plurality of RFID tags.

19. The method of claim 18, including storing a shared secret of the plurality of RFID tags, wherein the shared secret uses public and private keys to control access to the information on the RFID tags.

20. The method of claim 19, including sharing the shared secret while being powered through an external RFID field to exchange information through the physical data connectors.

* * * * *